United States Patent [19]

Schoon

[11] Patent Number: 4,847,607
[45] Date of Patent: Jul. 11, 1989

[54] IMAGE GENERATION FROM TRANSITION-ENCODED FONT INFORMATION

[75] Inventor: David J. Schoon, St. Paul, Minn.
[73] Assignee: Printware, Inc., St. Paul, Minn.
[21] Appl. No.: 96,960
[22] Filed: Sep. 15, 1987
[51] Int. Cl.$^4$ .............................................. G09G 1/16
[52] U.S. Cl. ................... 340/730; 340/703; 340/747; 340/790
[58] Field of Search ............... 340/749, 703, 730, 745, 340/735, 790, 721, 746, 729, 747

[56] References Cited

U.S. PATENT DOCUMENTS

4,233,601 11/1980 Hankins et al. ..................... 340/703
4,656,468 4/1987 Takikawa et al. .................. 340/747

Primary Examiner—Donald J. Yusko
Assistant Examiner—M. Fatahiyar
Attorney, Agent, or Firm—Dressler, Goldsmith

[57] ABSTRACT

Transition-encoded font image information—being a form of information flagging all pixel displacement locations upon a scan line of a raster scanning image generator, nominally a laser printer, whereat a marker, nominally a laser beam, transits from marking white to marking black, and from marking black to marking white, during the generation of the one scan line of a font image—is stored in two random access memories (RAMs) each having a nominal 10,320+ address corresponding to the 1200 pixel positions per inch across an 8.6" scan line. The two RAMs are sequentially read in parallel from the start-of-scan of the scanning marker, or laser beam. The successively read transition-encoded information is used to decrement a counter upon each black-to-white transition and to increment the same counter upon each white-to-black transition. The sign bit of the count within the counter is used to control the on/off, black/white condition of the laser beam marker so that white is imaged upon the scan line when the counter is negative, and so that black is imaged when the counter is positive, at pixel rates to 35 MHz.

15 Claims, 4 Drawing Sheets

IMAGE GENERATION FROM TRANSITION-ENCODED FONT INFORMATION

REFERENCE TO RELATED PATENT APPLICATIONS

The present patent application is one of three patent applications by the same inventor filed on an even date and assigned to the same assignee. The present U.S. Patent Application for Image Generation From Transition-Encoded Font Information teaches the use of a particular new type of information—which information regards the transitions, and the pixel locations of transitions, from both white to black, and from black to white, which are undergone along and upon a scan line—in order to generate a font image.

Companion related U.S. patent application Ser. No. 07/096,961 for Decompressing Run-Length-Encoded To Transition-Encoded Font Image Information In An Image Generator teaches the use of conventional, run-length-encoded, font image information to generate, by a process called decompression, a corresponding new type of information called transition-encoded information. This transition-encoded information represents every black-to-white, and every white-to-black, transition, and the pixel locations of each of these transitions, which are undergone by selective pixels upon a single scan line. A font image is generated as the synthesis product of many successive scan lines. It is this transition-encoded information which is used for image generation in accordance with the present invention.

Finally, companion U.S. patent application Ser. No. 07/096,959 for Combination Of Transition-Encoded Font Information For Generation Of Superimposed Font Images teaches a manner of combining transition-encoded information in order to simultaneously image a plurality of superimposed font images. It is especially taught how to combine transition-encoded information for certain pixel points at which both transition-encoded font images simultaneously undergo a white to black (or a black to white) transition.

The three related patent applications are collectively concerned with the generation, use, and special combining for use, of a particular new form of encoded font image information—transition-encoded font image information—in and by an image generator device, nominally a printer. The contents of the aforementioned companion patent applications are incorporated herein by reference.

BACKGROUND OF THE INVENTION

1. Field of the Invention

The present invention generally relates to image generation hardware, particularly including printers and most particularly including non-impact printers. The present invention is concerned with the use of a particular new form of encoded information—transition-encoded font image information—in the generation of a font image. The manner by which this new information is generated will be explained somewhat simplistically in the present specification. A more sophisticated teaching of the preferred manner of the generation of this transition-encoded font image information is particularly taught in the aforementioned companion patent application Ser. No. 07/096,961. However, for purposes of understanding the present invention it is only necessary to simplistically understand the nature of transition-encoded information in order that it may be further understood how such information is used in the generation of images.

2. Description of the Prior Art

An image generator is a device which receives information, nominally in ASCII form, from a computer, a computer terminal, or other such device. The image generator interprets such information in order to effect a pixel by pixel monochrome or color control of a marking device. For example, an image generator may be within a printer. For example, the pixel by pixel monochrome control may be effected by an on/off control of a raster-scanned marking device such as a laser light beam.

During the course of image generation, the image generator, nominally a printer, needs to, and will, transform, or "decompress", certain high-level encoding, such as the ASCII encoding, representing the characters and the character fonts to be imaged (printed), into the more detailed notational encodings which represent the actual font images of each character to be printed. The actual font image information may be represented by bit map (raster scan) data, run length encoded raster scan data, or by outline format (similar to pen plotter format) data. These detailed encodings are the information which is actually used, in real time, to control the marking device of the image generator. For example, a certain single ASCII encoding always represents an "a". The image generator will transform this ASCII "a" into an image represented in a certain font; for example, a block "a" or an italic "a" or an inverse color "a" or literally thousands of particular ways of generating the font image of an "a" (all of which font images are recognizable to the human brain as an "a"). Each of these different images, although all are "a", has an associated detail encoding, unique from all other detail encodings.

A commonly used prior art form of such detailed encodings is bit-map encoding. A grid matrix of the image area is created. Within this grid area the presence, or absence, of a marking at each intersection of the grid in a formation of an image of a particular character of a particular font is represented by the presence, or absence, of a binary bit within a data store, or map, for that particular character and font.

The transformation, or decompression, of information encodings involved in bit-mapped image generation normally transpires as follows. When the device controlling an image generation inputs a character, for example, the ASCII encoded letter "a", then the image generator determines from internally stored information what some particular certain image of an "a" looks like in some particular font. Usually there is a pixel map stored in the image generator memory which "maps out" those pixels for which the marking device will be caused to be "on" and those for which it will be caused to be "off" during the generation of a particular font image for a particular character, thereby generating the desired white and black image of the character. The user normally additionally specifies a font type, font size, and various other information in order to select amongst many alternative ways of representing the same character, for example the small letter "a" as printed in many fonts (Roman, Italic, etc.) at many sizes, slants, boldness levels, etc.

Depending on the resolution, a substantial amount of memory space can be tied up in the bit mapped specification of each font. For example, if the resolution is 300×300 dots (or pixels) per inch (dpi), then a 12 point character (1/6" high) requires 1500 bits (30×50) of information. If the resolution is 1200×1200 dpi, then 24K bits of information are required. For one complete font alphabet of 128 characters, over 3 Megabits of information are required for the bit-mapped image representations of these 128 characters. Typically it is desired to have many fonts available simultaneously. The present industry trend is towards higher resolution and more fonts. This often results in memory requirements which are difficult, if not totally impractical. Some prior art image generation systems use hard discs for bit-mapped font image information storage. However, these systems run slower than certain prior art systems which store bit-mapped font image information in semiconductor random access memory (RAM) because of the longer access time of disk memory as compared to semiconductor RAM.

It is also known in the prior art to store font image information either in Programmable Read Only Memory (PROM), or on a disk, in a compressed mode. However, this compressed font image information is always fully "blown up" into full bit-mapped data in RAM. This bit-mapped information means that one bit of storage is required for each pixel of information on the page. In some image generators, the page to be printed is assembled on a pixel by pixel basis before it is printed. This is referred to as a "full bit map" system. It is quite flexible, but the cost is high.

A second problem with bit-mapped image generation systems occurs because of the trend towards higher densities and more fonts. It is currently desired to place characters at any position within an image area (on the page)—including in overlapped positions—without regard to where any other character might be placed. One way of doing this is to have a very fast and very capable microprocessor system place the information for each character in a large RAM. However, this adversely takes a lot of processing time while the printer engine sits idle and while the programmer sits impatiently as this information is being assembled.

The present invention is particularly concerned with the use of a new form of "transition-encoded" information in image generation. The related patent application Ser. No. 07/096,961 shows that the new form "transition-encoded" information is derived by transforming, in and by a new process called "decompression", certain conventional run-length-encoded font image information. Both the run-length-encoded information which is "decompressed", and the "transition-encoded" information into which it is "decompressed", represent the images of characters and of character fonts which are generatable by an image generator. The reason that the transformation, or "decompression", which is the subject of the related invention is performed is because run-length-encoded information is not directly usable to control the marker of an image generator, whereas this new form transition-encoded font information into which the run-length-encoded information is efficiently transformed will be shown by this disclosure to be highly effective for controlling a marker, in real time, to actually generate the image of a particularly chosen character at a particularly chosen font.

SUMMARY OF THE INVENTION

1. The Environment of the Present Invention, and its Relationship to Certain Other Inventions Within Related Patent Applications The present invention is embodied in an image generating system, nominally a printer, which uses a particular new format of information in the generation of a visually discernible font image. This new format of information useful in image generation is called transition-encoded information. It is derived by a transformation, or decompression, of run-length-encoded information concerning font images.

The image generating system in accordance with the present invention is conventionally commanded by a computer or the like. The system is commanded as to which particular character at which particular font (at which particular size, slant, density, etc.) should have its associated run-length-encoded font image information decompressed in order that, responsively to this decompressed information, the image generator should generate the appropriate font image of the appropriate character. The image generating system is also commanded as to where within the image area the font character image should be placed.

When so directed to generate a particular one of large number of characters at a particular one of a large number of fonts, the image generating system will decompress certain appropriate run-length-encoded information in order to produce, at one time, only so much transition-encoded information as controls the generation of one scan line. Subsequent decompressions of still further run-length-encoded information permit the generation of subsequent scan lines, and ultimately permit the generation of the entire font image. Thus the transition-encoded font information is transitory within the ongoing operation of the image generating system. Therefore, it might alternatively be considered that the system is for the real-time generation of raster scanned images immediately, but indirectly, from run-length-encoded information without the necessity of forming bit maps (from any information source). Instead of these bit maps, the marker of the image generating system will be controlled in generation of the image by an intermediary form of information called transition-encoded information.

2. Summary of a First Related Invention Usefully Understood for Understanding the Present Invention The present invention concerns the use of transition-encoded information in order to generate a font image. The manner as to how such information is derived, basically from run-length-encoded information, is discussed in the present specification, but the most extensive discussion of the derivation of transition-encoded font information is within the priorly-identified companion, related, patent application Ser. No. 07/096,961. Suspending for the moment the subject of the present invention as to how transition-encoded font information is preferably used to generate a font image, a summary of a first related patent application regarding the derivation of transition-encoded information is given in the rollowing five paragraphs in order that the nature of that particular, transition-encoded, information upon which the present invention (hereinafter summarized in the next section) operates may be better perceived.

U.S. patent application Ser. No. 07/096,961 teaches what transition-encoded information is (by definition), and how transition-encoded information is derived by transformation, or decompression, of run-length-encoded information. Run-length-encoded font image information does not use one piece of information for every pixel in the font image, but rather uses one piece of information for every transition. In this aspect it is quite different from bit-mapped information (into which it is often converted in the prior art) and is actually more similar to the transition-encoded information into which it is converted.

Run-length-encoded font information contains the incremental distance between white/black transitions in the font image. For example, for a given character in a given font, the information might be interpreted as (1) there are 11 pixels from the left margin of the character box to the first transition, which is white to black; (2) then there are 22 additional pixels of black, (3) then 13 more pixels of white, (4) then 8 more pixels of black, and (5) that is the end of that character. It is common practice to store font information in PROM or on disk in such a run-length-encoded form. Usually the amount of information required is smaller than that required otherwise, especially when the resolution is very high. Run-length-encoded information may fairly be described as "compressed".

Image generation cannot transpire diretly from this compressed run-length-encoded information. However, transition-encoded information may be quickly and efficiently produced from run-length-encoded information, and this transition-encoded information may then be used for image generation as is the subject of the present invention (to be summarized in the next Section 3). This production is called "decompression" because the transition-encoded information occupies more memory, albeit for but a short and temporary time during the generation of one scan line, than the run-length-encoded information from which it is derived.

The decompression of run-length-encoded information into transition-encoded information is done quickly and efficiently in a hardware system which runs "automatically" once a small amount of initial information has been supplied to it. Particularly, the hardware decompression system receives (i) the vertical position, (ii) the horizontal position, and (iii) a starting address in a font memory whereat a run-length-encoded description of a particular character font is stored (which image line is, in rudimentary form, a single line of print). The decompression system develops the transition-encoded information for a one scan line, of which scan lines a font lmage will normally contain many, at one time.

The transition-encoded information for each scan line is basically developed by adding, in an adder, the initial horizontal displacement address plus, in a cumulative fashion, the run-length-encoded font information for each character which appears, in a portion of such character, upon that scan line. The vertical position information is used to identify which characters within an image line may have portions within a particular one scan line of such image line. For example, the lower case character "a" may be generated using only roughly the lower half of these total scan lines which combinatorially generate a single image, or "print", line capable of showing both upper and lower case characters. Finally, certain counters, holding registers, and control codes make certain that the decompression of run-length-encoded data in order to generate successive scan lines of transition-encoded data is properly sequenced.

3. Summary of the Present Invention

The present invention concerns how transition-encoded information (once derived) may (then) be used to effect control of an image system marker, for example, a laser beam, which is generating an image. The transition-encoded information is preferably emplaced in two parallel random access memories (RAMs). (The preference for two RAMs, as opposed to one which would be adequate to hold trasansition-encoded information, is hereinafter discussed.) For example, consider each RAM as 16K × 1. When there are less than 16K pixels in one scan line then there is one-to-one correspondence between pixels upon the scan line and addressable memory cells within each RAM. Envision each RAM as initially containing all 1's. Now in the first RAM, a flag, say a "0", is stored at the point of every transition upon the scan line from white to black. And, in the second RAM, a flag, say a "0" again, is stored at the point of every transition upon the scan line from black to white. These flags, and the addresses at which they are stored, constitute transition-encoded information. This transition-encoded information can be recorded in any order. The number of bits which are changed is equal to the number of transitions in the scan line (a number which is far less than the number of pixels). The process of making and recording this information is the process taught within the related patent application, and occurs independently of the image generation process.

During the generation (e.g., the printing) of a scan line both RAMs are simultaneously read. An address counter supplies the address for both RAMs, and this counter counts sequentially at the pixel clock rate. Every time the first RAM outputs a zero, a counter is counted in a particular direction, nominally incremented. Every time the second RAM outputs a zero, the same counter is counted in the opposite direction, nominally decremented. The positive or the negative count of the counter is used to control the black, or the white, generation of successive pixels upon the scan line. For example, a positive count or a negative count within the counter may repectively control a laser beam to be "on" or "off", respectively generating white and black pixels in a positive image-generating system such as a video display unit, or respectively generating black and white pixels in a negative image-generating system such as electrostatic printer wherein the laser beam discharges selected areas of a photoconductive surface.

Although there exists a further refinement both to the generation of transition-encoded data and its use particularly for overlapping font images, which refinement is presented in copending U.S. patent application Ser. No. 07/096,961, the present invention discloses the basic, prefered, format of transition-encoded information and its basic use for generating pixels upon a scan line.

4. Collective Objects of the Related Inventions

It is one object of the collective inventions within the three related patent applications to achieve full bit-mapped performance, but at a cost and complexity far below that of a full bit mapped system. Still further, it is the objective of the three inventions to improve the processing speed over that speed otherwise available except at very high cost. This cost performance improvement is obtained because the image generator hardware system will perform "intelligent" operations which might usually be associated with the capabilities of, and operations performed by, a microprocessor.

5. Particular Objects of the Present Invention

It is one particular object of the individual present invention to efficiently and quickly use a new, non-bit-mapped, format of information called transition-encoded font information to control the white or black generation of each pixel upon each scan line produced by an image generator. The use will be sufficiently efficient and quick when implemented with commonly available integrated circuit components so as to allow imaging (printing) on the order of 8 pages per minute (PPM) at 600 dots per inch (DPI) vertical resolution and 1200 DPI horizontal resolution, or 2 PPM at 2400 DPI vertical resolution and 1200 DPI horizontal resolution.

It is the further particular object of the individual present invention that the efficient and quick use of transition-encoded font information used for image generation is without any substantial limitations upon the numbers of transitions which can occur within a single scan line, every pixel permitting of a transition should display of the font image so require. Since there is no limit on the flexibility of the display, similarly to bit-mapped encoding of pixel black/white state, then the variety and the types of fonts—including logos, signatures, bar codes, pictographs and pictures as well as alphanumeric characters—which can be displayed on demand at sizes from 4 to 255 points is not limited by the generation of images in accordance with the present invention. In other words, speed and flexibility of imaging within the present invention is limited only by the circuitry which creates the transition-encoded information (which circuitry is described in a related patent application) and will not be limited by the manner in which transition-encoded information may be used, in accordance with the present invention, to generate a font image.

It is a further particular object of the present invention that transition-encoded font information should be used to control the generation of successive black or white pixels within a raster scan line at high speed. Particularly, 1200 pixel dots per inch (DPI) will be placed across a horizontal scan line of greater than 8.5 inches in length within a time period of less than 1100 microseconds (1/900 second) by the use of only common, readily available, integrated circuit components. If RAMs of high speed are used then the performance limit of imaging in accordance with the present invention is very high, having more to do with the rapidity with which the transition-encoded information can be generated than with the subsequent use of such information in image generation.

DESCRIPTION OF THE PREFERRED EMBODIMENT

The present invention resides within an image generator, or processor, which is nominally used as an intelligent controller for a non-impact, laser, printer. The image generator, and present invention, can be used for generating images which are not printed, such as those appearing on a video display unit. The image generator uses real-time raster scan techniques in accordance with the present invention and related inventions to create typeset quality images of 1200 horizontal×1200 vertical dots per inch (DPI) at the rate of four 8-½"×11" pages per minute (PPM). At such resolution and speeds the image generator must supply pixel by pixel information to turn the image marker—a laser beam—"on" and "off" at speeds up to 35 MHz. The present invention and related inventions allow accomplishment of this high speed control without requiring those very large amounts of high speed, and expensive, memory which would be required by prior art full bit mapped raster scan techniques.

Some rationale for the approach by the present invention and related inventions is as follows. As discussed in the Background of the Invention section, a bit-mapped representation of an entire image line uses considerable amounts of high speed and expensive random access memory (RAM). An image line is of variable height dependent upon the type of font and the font height (from 4 to 255 points) being represented, and is nominally 8.6 inches in width. An image line is normally comprised of a large number of horizontal scan lines. Thus it might be investigated if RAM requirements could be reduced by bit-mapping at the scan line, as opposed to the image line, level. For the 8.6" wide image area, and at 1200 dpi, there are 10,320 pixels in each scan line. A straightforward approach would be to try to prepare a bit-mapped RAM storage wherein each address is one pixel and wherein a stored "1" represents black while a stored "0" represents white. This turns out to be a brute force approach to producing the information needed to control the pixel by pixel, black and white, generation upon a scan line. Moreover, at high pixel rates of scan line generation there is insufficient time, at least when using common integrated circuit semiconductor components, to prepare an approximate 10,320 addresses of bit-mapped RAM storage during an approximate 1100 microsecond generation of each scan line. The present invention and related inventions use an alternative approach to the prior art bit-mapped control of pixel generation.

Figure 1:
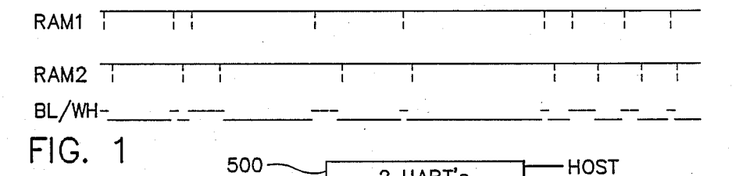
FIG. 1 shows a representation of the control of an image system marker by transition-encoded information in accordance with the present invention.

In this alternative approach a memory space of 16,384 pixels (10,320, plus unused extras) is mapped out twice; once for white-to-black transition points, and a second time for black-to-white transition points. The representation of this mapping is shown in FIG. 1. Although one physical RAM could be mapped two times—once with a first-type flag at white-to-black transition points and again with a second-type flag at black-to-white transition points—it has been found that the use of two parallel RAMs is advantageous. The black-to-white transitions are recorded in a nominal first random access memory RAM1, and the white-to-black transitions are recorded in random access memory RAM2. Within FIG. 1 the left-to-right extension of the lines at RAM1 and RAM2 represent the memory addresses (10,320 +) of each random access memory while the vertical "tick marks" represent the relative locations within each random access memory whereat the flags are stored.

Observing FIG. 1, the convention is employed that each RAM is initially written to all 1's, (shown as a high level) and each transition indicated by a "0" (shown as a low-going spike). It may immediately be recognized that information is not required to be written into the RAMs for every pixel. All that is necessary is to determine whether each transition within run-length-encoded font information represents black-to-white or white-to-black, and to insert that information into the proper address of the proper one of each of two initialized RAMs. The information about transitions which is inserted into random access memory at certain addresses, corresponding to pixels, at which such transitions occur is called transition-encoded information.

In the approach to image generation of the present and related inventions, the transition-encoded information within the two RAMs—RAM1 and RAM2—will be read simultaneously sequentially during the printing of each scan line. The reading will start when the start of scan (SOS) signal from the marker system, e.g. from a laser scanner, indicates the beginning of a scan line.

An address counter supplies the address for both RAMs, and this counter counts sequentially at the pixel clock rate. It should now be considered that the preferred method and apparatus in accordance with the present invention is not the only way to control the generation of an image from transition-encoded information. As a somewhat simplified, rudimentary, process for generating an image scan line, every time the RAM1 outputs a zero, then a flip-flop is toggled to "black". Every time the RAM2 outputs a zero, then the same flip-flop could be toggled to "white". This simplified approach would be basically capable of using transition-encoded information to control the white and black generation of pixels upon a scan line, but it is not the preferred approach in accordance with the present invention. The control of the marker responsive to the example flags stored in RAM1 and RAM2 is illustrated as line BLACK/WHITE shown in FIG. 1.

The image generation approach of the present invention, which approach is based on transition-encoded information stored in two seperate memories and read in parallel to a counter, incorporates further sophistication useful in a high performance image generator. For example, consider in light of the above discussion of the simplified, rudimentary, approach to image generation from transition-encoded information that if it is attempted to twice identify a single given pixel as representing an "on" transition—such as might reasonably occur for two overlapping character fonts—followed by an identification of each of two separate other pixels as representing "off" transitions, then an error will occur. Mainly, the marker has been turned "on" but once while being turned "off" twice. Thus, in the simplified and rudimentary method of using transition-encoded information to toggle a flip-flop for marker black/white control, it is possible to have overlapping characters; but only to an extent. "On" transitions must not coincide, and "off" transitions must not coincide. This restriction is a limit which makes the simplified, rudimentary, scheme inadequate to substitute for a full bit-mapped scheme. Accordingly, the preferred method and apparatus in accordance with the present invention is required in order to realize the fullest potential of transition-encoded information. The image generation system apparatus, and the image hardware processor within such system, within which the preferred embodiment of the present invention is located will be shown in respective FIGS. 2 and 3 prior to illustration of the preferred embodiment of the present invention within FIG. 4.

Figure 2:
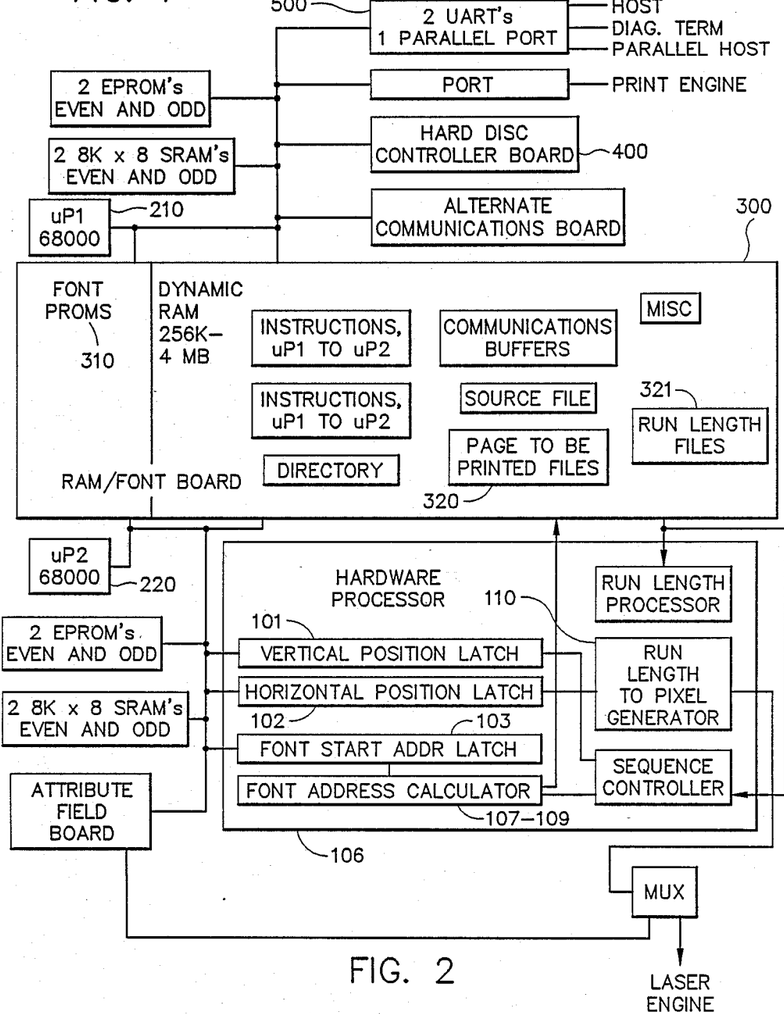
FIG. 2 shows a block diagram of an image processing system including an image generator hardware processor wherein the present invention resides.

A block diagram generally showing the hardware environment—a complete image generator—of a preferred embodiment of a system within which the present invention resides is shown in FIG. 2. This preferred system embodiment is particularly for use in a laser printer, and within such a system the HARDWARE PROCESSOR shown in FIG. 2 is the particular location of the present invention. The entire image generator block diagrammed in FIG. 2 converts ASCII character information into pixel by pixel control of a raster scanning laser printer. The image generator is managed by two microprocessors, nominally including a first microprocessor uP1 210 type 68000 controlling external communications to and from a computer or the like, handshakes with the printer engine, and the placing of data within the font memory RAM/FONT BOARD 300. A second microprocessor uP2 220 type 68000 interacts with the same font memory RAM/FONT BOARD 300 to move certain initial data to the HARDWARE PROCESSOR 100 in response to a print command. This certain data is in the nature of the vertical and horizontal position at which printing is to transpire and the first address of a font which is to be printed from the location of this upper left-hand corner pixel. The second microprocessor uP2 does not do the decompression of run-length-encoded data into the transition-encoded data which is used to control the black/white transitions of the print engine. Rather, it just "kicks off" each font which is to be printed, and where (including in overlapping position) the font is to be so printed. Then the HARDWARE PROCESSOR in accordance with the present invention will attend to all necessary control of the laser marker of the printer.

The exact sequence of "feeding" run-length-encoded font information, and positional information, to the HARDWARE PROCESSOR 100 could be accomplished in diverse ways. One way is to store a most condensed run-length-encoded form of font information in the FONT PROMS 310 part of the RAM/FONT BOARD 300, or, alternatively and additionally, upon a hard disk which is accessed through HARD DISK CONTROLLER BOARD 400. In accordance with the font size, or scaling, received from the computer HOST via the 2 UARTS, 1 PARALLEL PORT 500 the first microprocessor uP1 210 expands the run-length-encoded information (still as run-length-encoded information, now scaled) and emplaces it in the dynamic RAM of the SOURCE file, part of the RAM within the RAM/FONT BOARD 300. The first microprocessor uP1 in response to input commands also assembles a complete PAGE TO BE PRINTED FILES 320, part of the RAM/FONT BOARD 300 which contains a page image entirely in (appropriately scaled) run-length-encoded information. This is a modest amount of work, but a large and highly time constrained task remains in controlling the black/white state of the print engine marker to image this information during high speed scan lines of approximately 10,320 pixels each during a scan time period of approximately 1100 microseconds. This task is initiated by the second microprocessor uP2 220 which reads the PAGE TO BE PRINTED FILE 320 and, responsively thereto, places information regarding which character and which font (i.e., what starting address within the FONT PROMS 310), horizontal position, and vertical position within the HARDWARE PROCESSOR 100. The HARDWARE PROCESSOR 100 takes this initial information, basically in the nature of commands or directives, and uses it to extract appropriate compressed font run-length-encoded information from the dynamic RAM of the PAGE TO BE PRINTED FILE 320, and to assemble the "on" and "off" transition addresses of the transition-encoded information. From this transition-encoded information the RUN LENGTH TO PIXEL GENERATOR 110, which is the subject of the present invention, will control the LASER of the print ENGINE to turn "on" and "off", producing respective white and black imagery "on the fly".

Figure 3A:
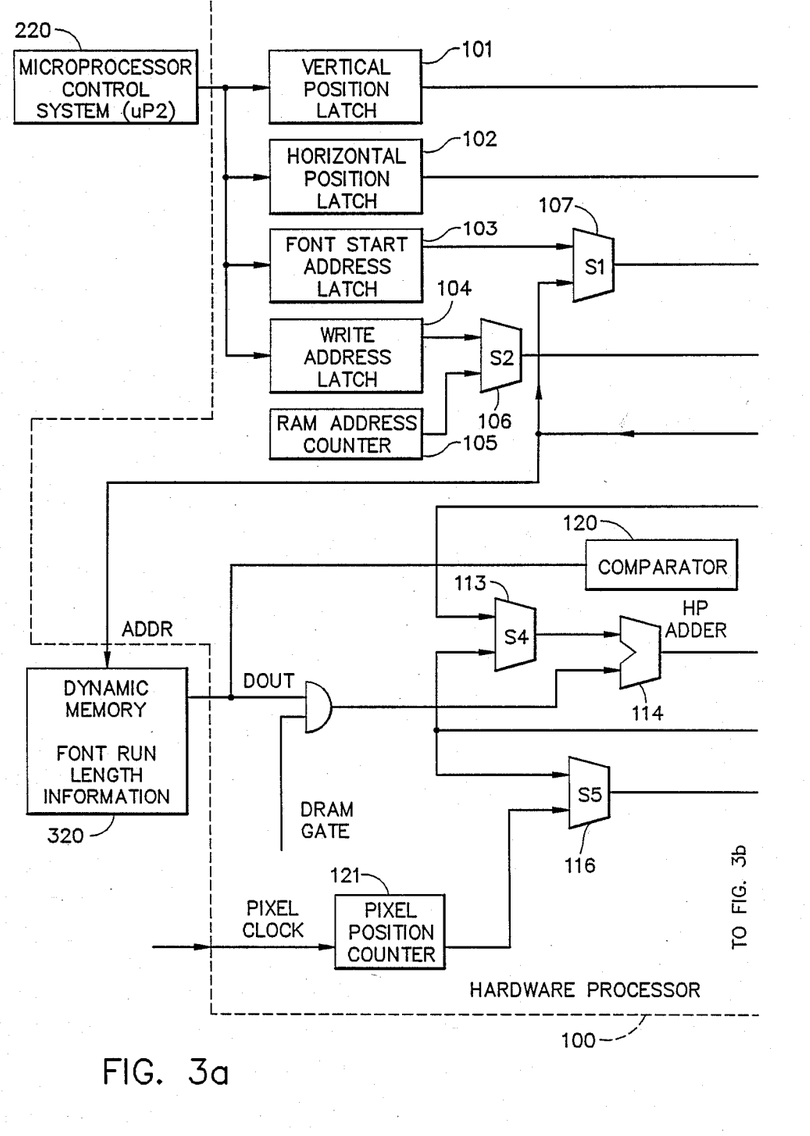
FIG. 3 shows a hardware block diagram of the image generator hardware processor, previously seen in FIG. 2, wherein the present invention for the use of transition-encoded font information in font image generation resides.
Figure 3B:
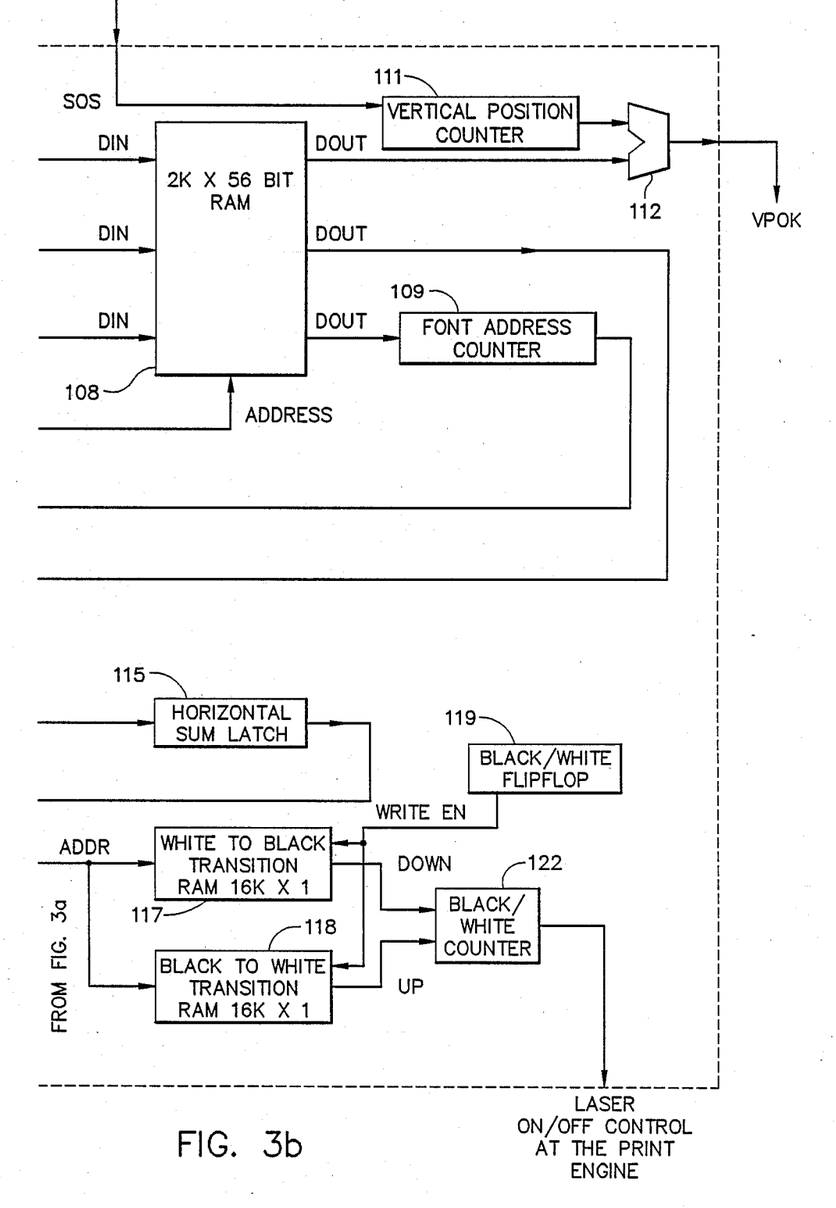

A hardware block diagram of a preferred embodiment of a HARDWARE PROCESSOR 100 (previously seen in FIG. 2) for decompressing, or transforming, run-length-encoded information into transition-encoded information and for using this transition-encoded information to generate each scan line of a font image, is shown in FIG. 3. The MICROPROCESSOR CONTROL SYSTEM uP2 220 loads information for vertical position (16 bits), horizontal position (16 bits) and font start address (24 bits), respectively into the VERTICAL POSITION LATCH 101, the HORIZONTAL POSITION LATCH 102, and the FONT START ADDRESS LATCH 103. It then picks an address location which is known to be available, and loads that information in the WRITE ADDRESS LATCH 104. An automatic sequence causes the aforementioned 56 bits of information to be loaded into one address of the 2K×56 BIT RAM 108. During this process, selector S2 106 is set to convey information from the WRITE ADDRESS LATCH 104 to the address input of the 2K×56 BIT RAM 108. At all other times selector S2 106 is set to convey the RAM ADDRESS COUNTER 105 information to the 2K×56 BIT RAM 108 address input. Moreover, during this time selector S1 107 is set to convey information from the FONT START ADDRESS LATCH 103 to the 2K×56 BIT RAM 108. Writing to this RAM 108 occurs by cycle stealing, i.e. all other processes which might be operating are interrupted for one clock cycle in order to permit writing information into this RAM 108.

The information that has been loaded into the RAM 108 is the (x, y) position on the page whereat an upper left corner of a font is to be generated, together with the address, in the DYNAMIC MEMORY 320,321, of where that particular font begins to be described in (previously appropriately scaled) run-length-encoded information. The DYNAMIC MEMORY/FONT RUN LENGTH INFORMATION 320,321 was previously called the PAGE TO BE PRINTED FILES 320, and the RUN LENGTH FILES 321, in FIG. 2.

Once for every scan line in a raster scanned image generating system, the RAM ADDRESS COUNTER 105 is caused to sequence through all addresses of the 2K×56 BIT RAM 108, which will permit the processing of every character's information which is resident there. Up to 2K characters which have some part of such character falling anywhere upon a given scan line may thus be represented. Normally the number of characters which might fall on a given scan line is less than 1/10 of 2K, and may typically be as few as the number of alphanumeric characters which are typically within a single print line. Immediately, however, it is obvious that the decompression and the resultant image generation in accordance with the present invention is well able to take in stride very numerous and correspondingly narrow (less than an average of 6 dots wide at 1200 dpi) characters or, as is more commonly the case, overlapped and multiply overlapped and densely multiply overlapped characters.

Once for every sweep of a scan line, a SOS (start of scan) signal is generated. In a laser print engine scanning a laser beam by an oscillating or by a rotating mirror, this SOS signal might typically be generated responsively to the mirror position. This SOS signal causes the VERTICAL POSITION COUNTER 111 to increment. This COUNTER 111 refers to the current vertical position on a page of the scanning beam. The vertical position of a given character to be potentially printed (for which certain information is contained within the RAM 108) is, during each scan cycle when all information is checked, compared with the VERTICAL POSITION COUNTER 111 in comparator 112. If the vertical position on the page whereat a character is to be printed is advanced further down the page than that position where the scanning beam currently is, then the VPOK (for Vertical Position OK) signal is taken by the control system to inhibit any action for that character or RAM position.

Once the VPOK signal indicates, for a given character, that that character's vertical position is at or in arrears of the current vertical position of the scanning beam, then the control system causes information for that character to be processed. The information is processed in the following three steps, or cycles, plus a fourth step if an end code is seen.

In a first step, the 2K×56 BIT RAM 108 is read, causing the FONT ADDRESS COUNTER 109 to be loaded with a font address. Moreover, selector S4 113 conveys the horizontal position information from RAM 108 to the HP ADDER 114. The DRAM GATE signal is low, so that this gated horizontal position information is added to zero, and is then stored unchanged in the HORIZONTAL SUM LATCH 115.

In a second step the FONT ADDRESS COUNTER 109 provides address information to the DYNAMIC MEMORY 320, which contains run-length-encoded font information. The resulting Dout (data out) read from the DYNAMIC MEMORY 320 is gated to the HP ADDER 114, with the DRAM GATE signal being now high. At this time selector S4 113 acts to convey information from the output of the HORIZONTAL SUM LATCH 115 to the upper input of this HP ADDER 114. This makes that at the conclusion of the step, or cycle, when the output of the HP ADDER 114 is latched, then the HORIZONTAL SUM LATCH 115 will contain the sum of the original horizontal position (obtained from the 2K×56 BIT RAM 108) and the offset to the first transition (obtained from the DYNAMIC MEMORY 320). When this information is valid, then selector S5 116 will act to gate this information as signal ADDR to select an address in each of the two transition memories, namely the WHITE TO BLACK TRANSITION 16K×1 117, and the BLACK TO WHITE TRANSITION 16K×1 118. The BLACK/WHITE FLIPFLOP 119 is initialized to a state which permits this address information to be relevant to and used by the WHITE TO BLACK TRANSITION 16×1 117, but not to or by the BLACK TO WHITE TRANSITION 16K×1 118. A single-bit "transition occurs here" record is then stored in the former of the two RAMs 117,118. This record, or flag, is the beginning assembly of transition-encoded information. At the conclusion of this second cycle, the FONT ADDRESS COUNTER 109 is incremented.

The next, third, step or cycle is quite similar to the second step above, except for the following two occurrences. First, the BLACK/WHITE FLIP-FLOP 119 is now toggled so as to make the BLACK TO WHITE TRANSITION 16K×1 118 record the information which is generated, instead of the WHITE TO BLACK TRANSITION 16K×1 117. Second, the HORIZONTAL SUM LATCH 115 records the sum of the previous information, plus whatever offset is presented from the DYNAMIC MEMORY 320.

At the conclusion of this third step, the COMPARATOR 120 checks the most significant bit (which is not used by the HP ADDER 114 when the BLACK/WHITE FLIP-FLOP 119 is set for black/white transitions), and if that bit is high, this transition is considered to be the end of the character. If this is not the case, additional steps, or cycles, equivalent to steps two and three are repeated until such an end code is seen.

If such an end code is seen, then the following fourth step, or cycle, is then executed. The font contents of the FONT ADDRESS COUNTER 109 are written back into the 2K×56 BIT RAM 108 (with the selector S1 107 controlled to convey such information). Thus for the next scan line, the new font address information will start where the old font address information left off.

After steps one through four have been completed for a given character, then the RAM ADDR COUNTER 109 is incremented, and these four steps are repeated for each successive character until all of the potentially up to 2K characters which are potentially upon a single scan line have been processed. This processing has completely converted run-length-encoded information into transition-encoded information for a single scan line of the image generator.

The foregoing decompression, or conversion, or processing has served to record in the WHITE TO BLACK TRANSITION 16K×1 117, and in the BLACK TO WHITE TRANSITION 16K×1 118, the locations of the respective white-to-black and black-to-white transitions along a given scan line. Once this information has been recorded, then selector S5 116 is set to select the PIXEL POSITION COUNTER 121 to sequence through the memory locations of RAMs 117,118 in parallel, and to read the transition-encoded information stored therein. This information is read in parallel to the BLACK/WHITE COUNTER 122, and used to count down and/or count up this COUNTER 122. In the count so obtained, the most significant bit, or sign bit, is used to modulate the marker of the scanning system, or the LASER ON/OFF CONTROL AT THE PRINT ENGINE. The signal PIXEL CLOCK which feeds the PIXEL POSITION COUNTER 121 is a clock which completes one cycle for each and every advancement of the scanning beam by one horizontal pixel in distance. This COUNTER 121 is reset at the beginning of each scan line.

The COMPARATOR 120, when sensing information from the DYNAMIC MEMORY 320, also checks for a unique code (nominally "FF") which, when seen, indicates the end of the run-length-encoded information for the entire character font. When this code is seen, then the contents of the FONT ADDRESS COUNTER 109 are changed to represent an address out of range, which address is then recorded by the 2K×56 BIT RAM 108. When this same location in RAM 108 is next interrogated, then the control system interfacing with the HARDWARE PROCESSOR will check not only for VPOK (mentioned above), but also for a font address (as supplied to DYNAMIC MEMORY 320) which is within a permissible range. If this is permissible font address is not seen, then (further) image generation in response to that character is skipped. Thus characters may be skipped, or suspended from being actively used to control image generation, either because (1) their vertical position places them in a "waiting" status, or (2) their font address indicates that that character has been completely processed.

It should be noted that there are two types of stop codes for each font character. The first code suspends the reading of information for a given scan line, to be resumed on the next scan line. This code is a high, most significant, bit on the black duration information bytes (not being continuation bytes). The second code, as mentioned above, suspends information about the entire character.

Because of this detection of font addresses out of range, the second microprocessor uP2 220 (shown in FIG. 2) knows which locations in the 2K×56 BIT RAM 108 will have information which is no longer required, and thus information for new characters to be subsequently printed may be loaded in those locations.

Figure 4:
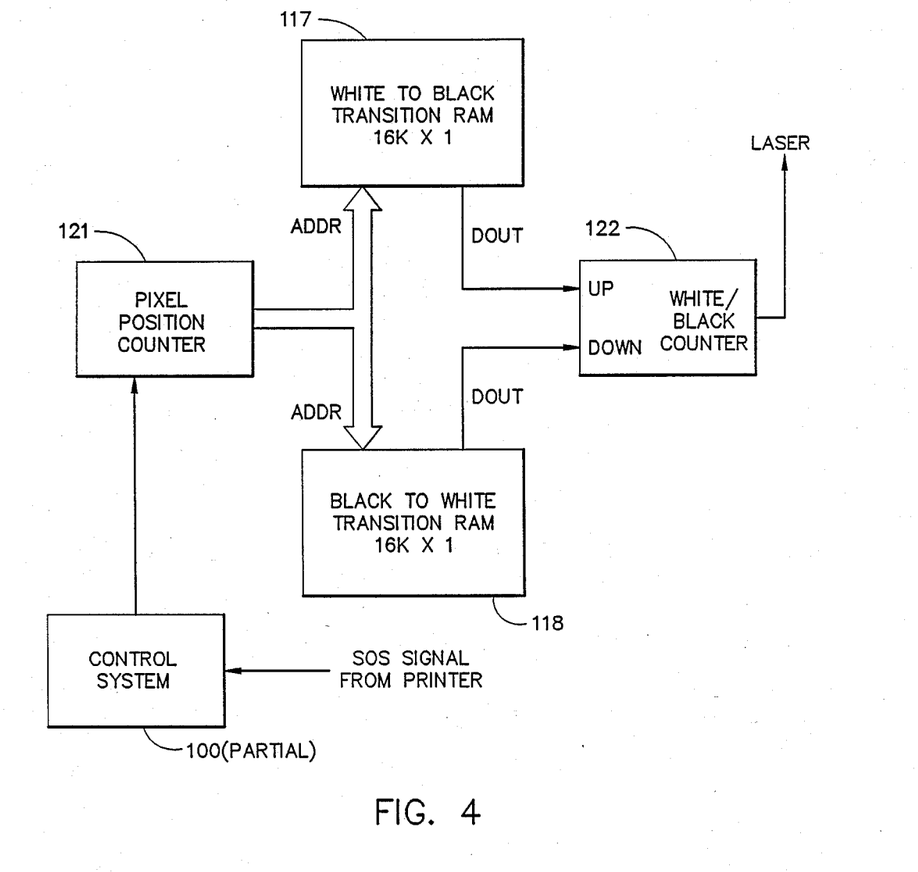
FIG. 4 shows an isolated hardware block diagram particularly of the preferred embodiment of the present invention for using transition-encoded font information to control the white and the black generation of pixels within a scan line, one of many such scan lines which collectively generate a font image.

Not shown in the block diagram of FIG. 4, to avoid complexity, is a further check of the run-length-encoded information received from DYNAMIC MEMORY 320 to look for another unique code (nominally "FE" or "7E"), which indicates that the spacing between successive transitions is too large to be represented in just a single byte. If that is the case, then the HORIZONTAL SUM LATCH 115 sums its old information plus the unique code, but no writing of that information occurs into the white/black or black/white transition RAMs 117,118, nor does the BLACK/WHITE FLIP-FLOP alter its state. The contents of the next location read from the DYNAMIC MEMORY 320 are added in as well, and if this unique code is not again repeated in that location, a transition is recorded.

A detail block diagram of the preferred embodiment of the present invention for generating images from transitionencoded font information is shown in FIG. 4. Each of the WHITE TO BLACK TRANSITION 16K×1 117, and the BLACK TO WHITE TRANSITION 16K×1 118 (both previously seen in FIG. 3) are so sized, for example, at 16K×1 when there are less than 16K pixels in one scan line. There is one-to-one correspondence between pixels upon the scan line and addressable memory cells within each RAM 117,118. Each RAM 117,118 is initialized, nominally to initially contain all 1's. In the first WHITE TO BLACK TRANSITION 16K×1 117 a flag, nominally a "0", is stored at the point of every transition upon the scan line from white to black. And, in the BLACK TO WHITE TRANSITION 16K×1 118 a flag, nominally a "0" again, is stored at the point of every transition upon the scan line from black to white. These flags, and the addresses within RAMs 117,118 at which they are stored, constitute transition-encoded information. This transition-encoded information could have been computed and recorded in any order. The number of bits which are changed is equal to the number of transitions in the scan line (a number which is generally far less than the number of pixels, but which can be as great as the number of pixels).

As previously explained in conjunction with FIG. 3, during the generation (e.g., the printing) of a scan line both RAMs 117,118 are simultaneously read. The PIXEL POSITION COUNTER 121 (previously seen in FIG. 3) supplies the address for both RAMs 117,118, and this counter counts sequentially at the pixel clock rate. Every time the WHITE TO BLACK TRANSITION 16K×1 117 reads a zero output, the BLACK/WHITE COUNTER 122 (previously seen in FIG. 3) is counted in a particular direction, nominally incremented, or "up". Every time the BLACK TO WHITE TRANSITION 16K×1 118 reads a zero output, the same COUNTER 122 is counted in the opposite direction, nominally decremented, or "down". The positive or the negative count of the counter is used to control the black, or the white, generation of successive pixels upon the scan line. The initialized, uncounted, "zero" condition of the counter nominally turns the laser to a condition (which may be either "on" or "off" dependent upon whether a positive or a negative image generation system is being employed) which produces black on the scan line—although even this is a matter of convention determined by the manner in which transition-encoded information is generated from run-length-encoded information. For example, a positive count or a negative count within the BLACK/WHITE COUNTER 122 may repectively control a laser beam to be "on" or "off", respectively generating white and black pixels in a positive image-generating system such as a video display unit, or respectively generating black and white pixels in a negative image-generating system such as electrostatic printer wherein the laser beam discharges selected areas of a photoconductive surface.

The addresses supplied by the PIXEL POSITION COUNTER 121 successively index through all locations of WHITE TO BLACK TRANSITION 16K×1 117, and of BLACK TO WHITE TRANSITION 16K×1 118, which locations correspond to real pixel positions upon the scan line. At these successive locations all the white-to-black and black-to-white transitions along the scan line are read. This transition-encoded information is read in parallel to the BLACK/WHITE COUNTER 122, and used to count down and/or count up this COUNTER 122. In the count so obtained, the most significant bit, or sign bit, is used to modulate the marker of the scanning system, or the LASER ON/OFF CONTROL AT THE PRINT ENGINE. The signal PIXEL CLOCK which feeds the PIXEL POSITION COUNTER 121 is a clock which completes one cycle for each and every advancement of the scanning beam by one horizontal pixel in distance. This COUNTER 121 is reset at the beginning of each scan line.

In accordance with the preceding discussion, certain variations in the method and apparatus in accordance with the present invention will suggest themselves to a practitioner of the art of image generator design. For example, the transition-encoded information need not have been stored within, nor read from, randomn access memory or memories, but could instead have been located in a serially addressable memory or memories which, while possibly less efficient for the storage of transition-encoded information, would function admirably for image generation from the transition-encoded information stored therein. For example, many of the conventions regarding initialization states, the binary values of flags and/or information, and black/white control should be understood to be arbitrary, and subject to variation while still being within the scope and spirit of the present invention. Accordingly, the present invention should be defined by the scope of the following claims, only, and not solely in accordance with that preferred embodiment within which the present invention has been taught.

What is claimed is:

1. An apparatus for controlling the marker of a raster scanning image generator responsively to transition-encoded information, the apparatus comprising:
   a memory for storing the transition-encoded information;
   an address sequencer for reading the transitionencoded information from successive addresses of the memory;
   a counter receiving the transition-encoded information from the memory for counting in a first direction for each receipt of transition-encoded information indicating that the marker should transit from black to white, and for counting in a second direction for each receipt of transition-encoded information indicating that the marker should transit from white to black; and
   marker control means responsive to a sign bit of the count of the counter for controlling the marker to generate white if the sign bit is of a first sense, and to generate black if the sign bit is of the opposite sense.

2. The apparatus according to claim 1 wherein the memory comprises:
   a first memory for storing transition-encoded information regarding all transitions from black to white; and
   a second memory for storing transition-encoded information regarding all transitions from white to black;
   wherein the address sequencer is reading the first memory and the second memory in parallel;
   wherein the counter is responding to the transitionencoded information received from both the first memory and the second memory.

3. The apparatus according to claim 1 wherein the counter is decrementing in the first direction and incrementing in the second direction, and wherein the first sense of the sign bit is negative and the second sense of the sign bit is positive.

4. An apparatus for controlling the marker of a raster scanning image generator responsively to transition-encoded information, transition-encoded information being a form of information flagging all displacement locations upon a scan line whereat the marker of the image generator transits from a first, nominally black, to a second, nominally white, image-generating condition and also flagging all locations upon the same scan line whereat the marker transits from the second to the first condition during generation of an image, the apparatus using transition-encoded information to control an image generator marker comprising:
   a memory, having a multiplicity of addresses corresponding to a multiplicity of displacement positions upon a scan line of a raster scanning image generator, for storing transition-encoded information (i) as first-type flags at all addresses corresponding to scan line displacement positions whereat the marker of the image generator must undergo a first-type, black to white, transition, and (ii) as second-type flags at all addresses corresponding to scan line displacement positions whereat the marker of the image generator must undergo a second type, white to black, transition, during generation of the scan line during generation of the image;

an addressing counter for reading the multiplicity of the addresses of the memory in correspondence to the movement of a marker of an image system across those displacement positions upon the scan line to which the multiplicity of addresses correspond;

a bidirectional counter, receiving the transition-encoded information read from the memory by the addressing counter, for not counting if neither a first-type nor a second-type flag is received, and for counting in a first direction upon each receipt of a first-type flag, and for counting in a second direction, opposite to the first direction, upon each receipt of a second-type flag; and a marker controller for causing the marker to assume and maintain a condition generating white for so long as the bidirectional counter exhibits a net count in the first direction, and for causing the marker to assume and maintain a condition generating black for so long as the bidirectional counter exhibits a net count in the second direction.

5. The apparatus according to claim 4 wherein the memory comprises:

a first memory for storing the first-type flags; and
a second memory for storing the second-type flags;

wherein the addressing counter is addressing both the first memory and the second memory in parallel, and reading the first-type flags and the second-type flags stored therein to the bidirectional counter in parallel.

6. The apparatus according to claim 4 wherein the bidirectional counter is decrementing upon each receipt of a first-type flag, and is incrementing upon each receipt of a second-type flag.

7. The apparatus according to claim 6 wherein the marker controller is causing the marker to assume the condition generating white for so long as the bidirectional counter exhibits a negative count, and is causing the marker to assume the condition generating black for so long as the counter exhibits a count of zero or greater.

8. The apparatus according to claim 4 wherein the marker controller is controlling the on/off condition of a scanning laser beam.

9. The apparatus according to claim 8 wherein the marker controller causes the laser marker to assume its condition generating white by turning the laser beam on, the image generator forming a positive image in response to the laser beam.

10. The apparatus according to claim 8 wherein the marker controller causes the laser marker to assume its condition generating white by turning the laser beam off, the image generator forming a negative image in response to the laser beam.

11. A method of using run-length-encoded font image data to control the imaging of a single scan line that is one line within an entire font image consisting of many lines formed in and by an image generating device, wherein the run-length-encoded font data is of the form of the number of pixels from the edge margin of a character box until a first, nominally black-to-white, transition, and then continues with the number of pixels prior to a next complementary, nominally white-to-black, transition, and is likewise then continuing with the numbers of pixels between all successive transitions upon a scan line, whereby the method controls a white and a black state of a marker within an image generator as such marker traces the single scan line, the method of using run-length-encoded font data to control an image generator comprising:

decompressing, in logic circuitry, run-length-encoded font image data for a single scan line into first quantities representing the numbers of pixels across a scan line whereat each black-to-white transition occurs, and into second quantities representing the numbers of pixels across the scan line whereat each white-to-black transition occurs, during generation of so much of the font image as is within and upon the single scan line;

storing in a transition memory having addresses corresponding to the pixels upon the scan line, first-type flags at addresses equal to the first quantities and, also, second-type flags at addresses equal to the second quantities;

sequentially addressing and reading the memory during and upon each such time as each corresponding successive pixel is to be generated upon the scan line;

comparing the cumulative numbers of first-type flags that have been read to the cumulative numbers of second-type flags that have been read during and upon each sequential addressing of the memory, and thusly during and upon each such time as each corresponding pixel is to be generated upon the scan line; and controlling an image generator tracing the single scan line to generate white upon the scan line upon each time when the comparing determines that the cumulative numbers of first-type flags read exceed the cumulative numbers of second-type flags read, else to generate black upon the scan line upon each time when the comparing determines that the cumulative numbers of second-type flags read equal or exceed the cumulative numbers of first-type flags read;

wherein the sequentially addressing and reading, the comparing, and the controlling are transpiring during and upon each such time as each pixel is generated.

12. A method, performed in a device generating images in and by a succession of scan lines, for proceeding from (i) information that a particular one font image is to be generated, and (ii) run-length-encoded information of the graphical representations of a plurality of font images including the particular one font image, into controlling the black, and the white, pixel generation upon each of a succession of scan lines, which scan lines collectively form a graphical image of the particular one font, said method comprising:

storing in a font memory the run-length-encoded information of the graphical representations of a plurality of font images;

referencing, by addressing logic employing the information that a particular one font image is to be generated, the font memory so that displacement data regarding all black-to-white and all white-to-black transitions upon each scan line is successively read;

decompressing the successively read displacement data of all those transitions occurring upon each of the scan lines into (i) first, black-to-white, flags which are stored at addresses, corresponding to pixel positions, within a transition memory, wherein these first flags at particular transition memory addresses demark certain corresponding particular pixels within a scan line at which pixels the scan line must undergo a black-to-white transition during a generating of the graphical image of the particular one font, and (ii) second, white-to-black, flags which are stored at addresses within the transition memory, wherein these second flags at particular transition memory addresses demark certain corresponding particular pixels within the scan line at which pixels the scan line must undergo a white-to-black transition during a generating the graphical image of the particular one font;

reading the successive addresses of the transition memory upon the scanning of each scan line, communicating those first flags and those second flags which are read from the transition memory to a black/white counter;

decrementing the black/white counter upon receipt of any first, black-to-white, flags, and incrementing the black/white counter upon receipt of any second, white-to-black, flags;

controlling the generation of successive pixels upon each scan line to be black upon such times as a count within the black/white counter is positive, else controlling the generation of successive pixels upon each scan line to be white upon such times as the count within the black/white counter is negative;

repeating the referencing, the decompressing, the reading, the incrementing and decrementing, and the controlling for each of a succession of scan lines until an entire graphical image of the particular one font is generated.

13. A method, performed in an image generating device, of indirectly using run-length-encoded font image data to control the white, or the black, generations of a marker which is marking successive adjacent pixels along a scan line, one of many such scan lines collectively constituting the font image, the method comprising:

decompressing run-length-encoded font image data by storing black-to-white flag bits at particular addresses of a first memory, the successive addresses of which first memory correspond to successive pixels upon a single scan line;

wherein the particular first-memory addresses at which the black-to-white flag bits are stored correspond to those particular pixels at which a transition from black to white must occur in generation of a single scan line across the font image;

further decompressing the same run-length-encoded font image data by storing white-to-black flag bits at particular addresses of a second memory, the successive addresses of which second memory likewise corresponding to the same successive pixels upon the single scan line;

wherein the particular second-memory addresses at which the white-to-black flag bits are stored correspond to those particular pixels at which a transition from white to black must occur in generation of the single scan line across the font image;

sequentially addressing both the first memory and the second memory in parallel during the generation of successive adjacent pixels upon the single scan line;

reading each black-to-white flag bit sequentially addressing within the first memory as a first-sign data input to a bidirectional counter;

reading each white-to-black flag bit sequentially addressed within the second memory as a second-sign, opposite to the first-sign, data input to the bidirectional counter;

controlling the marker to generate successive black pixels upon the single scan line upon such times as the bidirectional counter contains a positive count, and to generate successive white pixels upon such times as the bidirectional counter contains a negative count.

14. A method, performed by an image-generating apparatus producing a scan line having both light-colored interval portions and dark-colored interval portions, of controlling the producing of the respective light-colored and dark-colored interval portions of the scan line, said method comprising:

storing within a memory having sequential addresses corresponding to all the sequential pixel points upon a scan line a first-type, dark-to-light transition, quantity at all addresses corresponding to pixels whereat the scan line undergoes a transition from dark-colored to light-colored, and also storing a second-type, light-to-dark transition, quantity at all addresses corresponding to pixels whereat the scan line undergoes a transition from light-colored to dark-colored;

sequentially addressing the sequential addresses of memory in real time during a generating of the corresponding pixels upon the scan line;

comparing the numbers of first-type quantities to the numbers of second-type quantities read in real time during sequentially addressing the memory, and thus also in real time during the generating of the corresponding pixels upon the scan line;

controlling in real time the producing of the pixels upon the scan line to be light-colored when the comparing determines that the numbers of first-type quantities exceeds the numbers of secondtype quantities and to otherwise be dark-colored when the comparing determines that the numbers of second-type quantities equals or exceeds the numbers of first-type quantities.

15. The method according to claim 14 which before the storing further comprises:

decompressing, in logic circuitry, run-length-encoded font information, stored within another memory, into said all addresses corresponding to pixels whereat the scan line undergoes a transition from dark-colored to light-colored, and also into said all addresses corresponding to pixels whereat the scan line undergoes a transition from light-colored to dark-colored.

* * * * *